May 1, 1962 D. W. BREDE 3,032,285

MAGNETIC TAPE APPARATUS AND CYCLING CONTROL THEREFOR

Filed Aug. 17, 1959

INVENTOR
DWIGHT W. BREDE

BY Flehr & Swain
ATTORNEYS 3,032,285

MAGNETIC TAPE APPARATUS AND CYCLING CONTROL THEREFOR

Dwight W. Brede, Mountain View, Calif., assignor to Ampex Corporation, Redwood City, Calif., a corporation of California Filed Aug. 17, 1959, Ser. No. 834,209
4 Claims. (Cl. 242—55.12)

This invention relates generally to a magnetic tape apparatus and more particularly to a cycling control for magnetic tape apparatus.

It is often desirable to be able to preset a recording and reproducing apparatus to automatically select and operate over a predetermined portion of a recording medium. For example, it may be desirable to read off a given data and to analyze the data in different manners during each read-off. In other applications, it may be desirable to cyclically operate over a given region to individually read one of a plurality of adjacent magnetic tracks formed on the recording tape. In the prior art, an operator was required to re-cycle the machine and index the heads to the proper location of the tape for re-running a given portion.

It is a general object of the present invention to provide a cycling controller which can be set to reverse operation of an associated machine at a predetermined point.

It is another object of the present invention to provide a magnetic tape apparatus which includes a pair of predetermined counters each adapted to form a control signal when a predetermined count is attained.

The foregoing and other objects are achieved by employing predetermining counters to select the mode of operation of a system which drives the counter. A first determining element is set to reverse the system operation in a desired fashion and a second predetermining element will return the system to its previous mode of operation. The two predetermining features can be separately adjustable and provide a control signal to an associated circuit.

These and other objects of the invention will become more clearly apparent from the following description when taken in conjunction with the accompanying drawing.

Referring to the drawing.

Figure 1:
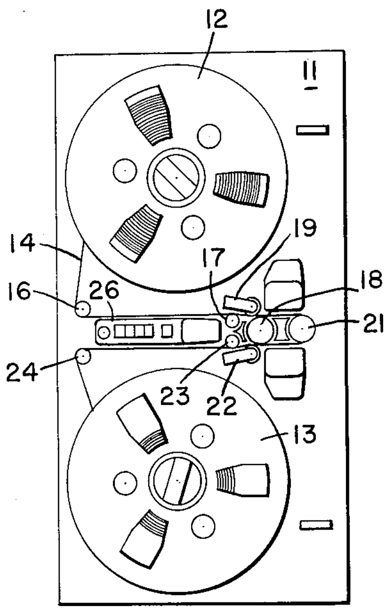
FIGURE 1 is a plan view of a magnetic tape apparatus incorporating the present invention.
Figure 3:
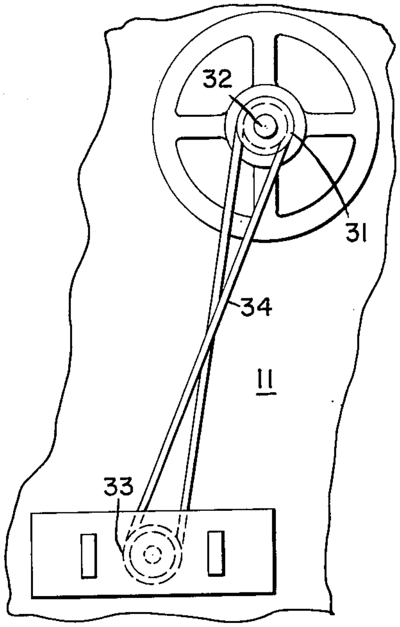
FIGURE 3 is an elevational view of a suitable drive means for mechanical predetermining counters.
Figure 4:
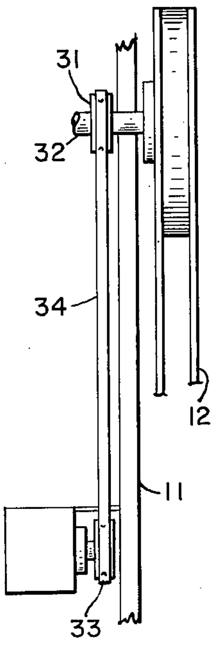
FIGURE 4 is a side elevational view of FIGURE 3.

Referring to FIGURE 1, the magnetic tape apparatus includes a framework 11 which carries the reels 12 and 13 with a tape 14 extending between the reels and past the transducer head assembly, to be presently described. The tape 14 travels over guide posts 16, and 17, capstan 18, and over the turn-around idler 21. Suitable clamping action of the tape against the capstan is provided by the clamping arm 19. The tape in its return loop passes again over the capstan 18, guide posts 23, and 24, and thence onto the take-up reel 13. Here again, a capstan idler or roller 22 serves to urge the tape against the capstan.

Figure 2:
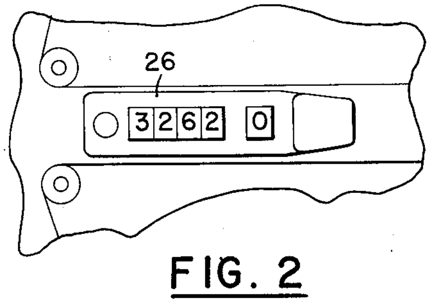
FIGURE 2 is an enlarged view of the footage indicator.

In general, the machine includes a display 26 shown in enlarged detail in FIGURE 2. The display 26 illustrated provides windows for the tape footage counter, and one window for another counter to be presently described.

Assuming that a mechanical counter is employed, a pulley drive 31 is carried on the drive shaft 32. A drive pulley 33 is carried by the counter and a belt 34 is adapted to drive the pulley 33 from pulley 31.

Figure 5:
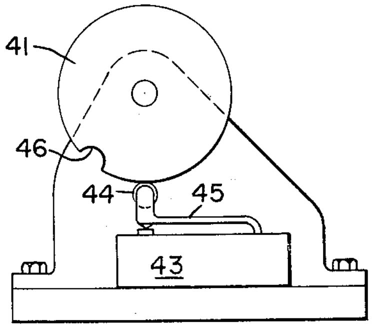
FIGURE 5 is an enlarged view showing a control signal forming arrangement.

The mechanical counter may include means of the type shown in FIGURE 5 for deriving an output signal when a predetermined count is reached. Thus, the switch 43 is activated when the notch 46 lies adjacent the roller 44 so that the arm 45 can actuate the switch 43. Preferably, one such switch 43 is associated with each of the display discs 41 and is connected in circuit to operate when a predetermined count is reached. Each counter may have one or more display discs 41, as is conventional in the art.

Figure 6:
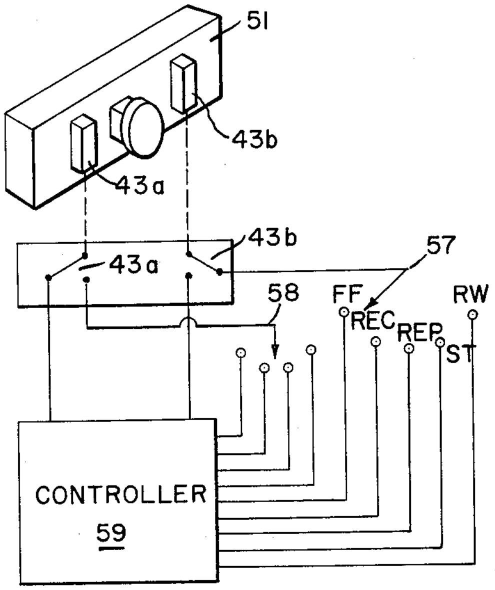
FIGURE 6 is a schematic block diagram of a complete cycling system.

Referring to FIGURE 6, a circuit showing the operation is presented. The preset counters are represented at 51. They include switches 43*a* and 43*b*. Each of the switches is connected to a mode selection switch 57 or 58. The mode selection switch 57 may include contacts for fast forward driving of the tape (FF), recording (REC), reproduction (REP), stopping (ST), or rewinding the tape (RW). When the function is selected, a circuit is formed between the switch 43*b* and the associated function in the controller 59. When the predetermined count is reached, the controller 59 sees a completed circuit since the switch 43*b* associated with the line 57 is closed and this will cause the controller to activate the apparatus to go into its new mode of operation.

The other predetermining switch 43*a* then takes over control and when the machine has gone through its new mode to the predetermined count on this switch, this switch contact is closed thereby connecting the mode which is set on the mode selector 58 to the controller. The tape will then proceed to carry out its instruction.

For example, on reaching the predetermined count on the counter associated with the switch 43*a*, the tape might go into the reproduce operation reproducing the signals recorded on the tape. When the predetermined count of the counter associated with the switch 43*b* is reached, the apparatus will stop reproducing and may go into a rewind operation which will rewind until it reaches the predetermined count on the other counter, at which time the machine again reproduces.

Assume that the tape which one desires to read lies between the tape footage indication 121 and 1210. When the machine reaches the 1210 indication on the display 26, the machine is stopped and the associated counter is set to zero. When the counter reaches its zero count, a signal is formed and, for example, goes through the switch 43*b* and controller switch 57 which is set to rewind. Thus, the mode of operation will then be a rewind mode, the apparatus continuing to rewind until the preset count on the counter is reached (121), at which time the apparatus will perform the function selected on the switch 58 as, for example, playback. The apparatus will then reverse and playback the recording up to the point previously preset (1210) in the first counter. The process will repeat until the machine is turned off or the control is taken away from the cycling circuits.

Although mechanical counters are illustrated, it is apparent that any type of counter which can be preset to close a switch or form an output signal upon attaining a predetermined count may be employed. Rather than mechanical drives, one can employ generators which derive signals indicative of the tape which has been used.

I claim:

1. In a magnetic tape apparatus of the type including magnetic transducers and means for moving said tape past said transducers, the combination comprising, first and second predetermined counters, means for driving said counters in response to movement of the magnetic tape, means associated with each of said counters for deriving an output signal when a predetermined count is reached, said counters being adjustable to reach said predetermined counts at respective selected points on said tape, and means repeatably responsive to said signals and serving to cause respective forward and reverse movements of said tape, whereby the portion of tape between said points is moved cyclically and repeatedly past the transducing heads of said apparatus.

2. In a magnetic tape apparatus of the type including magnetic transducers and means for moving said tape past said transducers, the combination comprising, first and second predetermined counters, means for driving said counters in response to movement of the magnetic tape, means associated with each of said counters for deriving a signal when a predetermined count is reached, said counters being adjustable to reach said predetermined counts at respective selected points on said tape means repeatably responsive to the signal from the first counter for cycling the apparatus into a new cycle of operation, and means repeatably responsive to the signal from the second counter for returning the system to its original mode of operation.

3. Apparatus as in claim 2 wherein each of said counters may be individually set to form a signal on a predetermined count.

4. In a magnetic tape apparatus of the type including magnetic transducers and means for moving said tape past said transducers, the combination comprising, first and second predetermined counters, said counters being adjustable to reach said predetermined counts at respective selected points on said tape means for driving said counters in response to movement of the magnetic tape, a switching circuit associated with each of said predetermined counters serving to repeatably form a continuous circuit when said predetermined count is reached, an operational mode selection switch selectively connected in circuit with said switching circuit, and a controller connected in circuit with said operational mode selection switch and with said tape moving and transducing means for controlling operation of the magnetic tape apparatus whereby the mode of operation of the apparatus is repeatedly changed in accordance with the setting of the operational mode selection switch each time a predetermined count is reached in each of said predetermined counters.

References Cited in the file of this patent

UNITED STATES PATENTS

| | | |
|---|---|---|
| 2,364,556 | Somers | Dec. 5, 1944 |
| 2,381,036 | Camras | Aug. 7, 1945 |
| 2,561,602 | Valentino et al. | July 24, 1951 |
| 2,595,545 | Rose et al. | May 6, 1952 |